F. K. SHAFFER.
CLAMPING DEVICE.
APPLICATION FILED MAY 20, 1912.
1,078,067.
Patented Nov. 11, 1913.
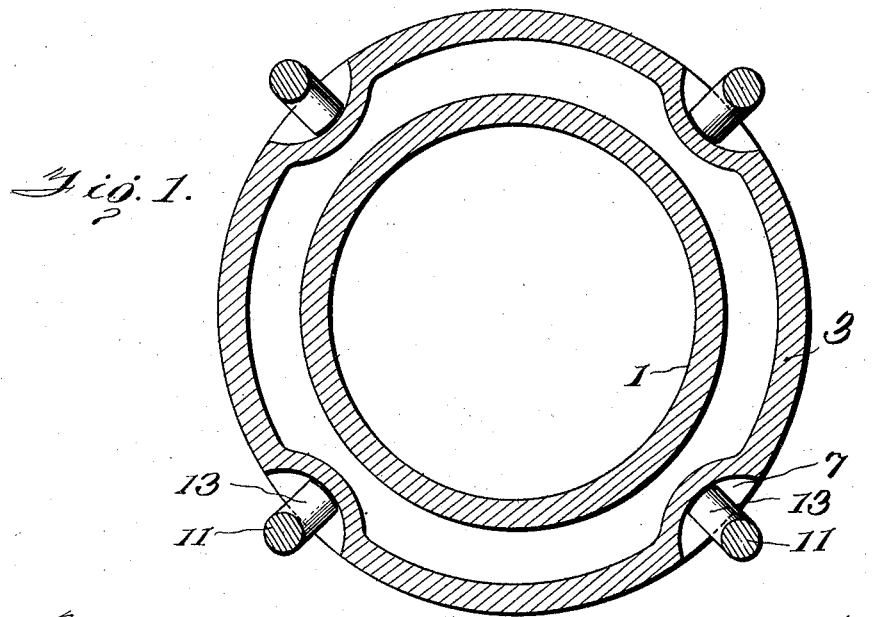
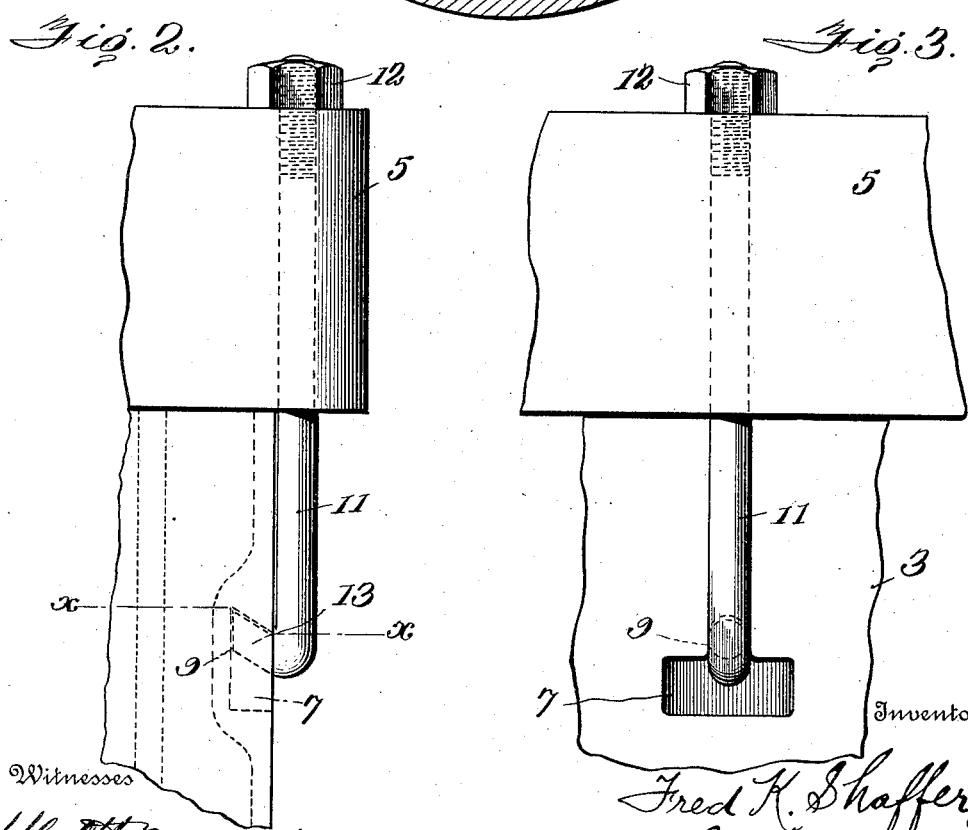

UNITED STATES PATENT OFFICE.

FRED K. SHAFFER, OF SEDALIA, MISSOURI.

CLAMPING DEVICE.

1,078,067.　　　　　Specification of Letters Patent.　　Patented Nov. 11, 1913.

Application filed May 20, 1912. Serial No. 698,604.

*To all whom it may concern:*

Be it known that I, FRED K. SHAFFER, a citizen of the United States, residing at Sedalia, in the county of Pettis and State of Missouri, have invented certain new and useful Improvements in Clamping Devices, of which the following is a specification.

This invention relates to clamping devices, and more particularly to certain improvements in such devices which are adapted for securing cylinder heads to the cylinders of gas, and other engines. The invention has other uses however, and may be employed equally well in other relations than those specified.

An object of the invention is to provide a simple and efficient form of bolt which coöperates with a novel form of recess in one of the parts to be clamped. Preferably, the bolt shank extends through the other part and receives a clamping nut which rests upon the member through which the bolt passes and operates in connection with said bolt to draw the parts together in a very simple and effective manner.

The several novel features of the invention and advantages which follow from their use will be made to more fully appear in the following specification.

In the drawings Figure 1 is a horizontal sectional view on the line $x-x$ of Fig. 2 of an engine cylinder to which my invention is applied; Fig. 2 shows in side elevation portions of a cylinder and cylinder head with the clamping bolt in position thereon; and Fig. 3 is a front elevation of the parts shown in Fig. 2.

The numeral 1 indicates the cylinder of a gas, or other engine having the usual water jacket 3, and the cylinder head 5 which rests upon, and is to be clamped firmly to the cylinder and water jacket. At suitable points in the circumference of the jacket 3 are formed, by casting, milling, or in any other desired manner, pockets or recesses 7, each of which is formed with an inner wall, curved in the arc of a circle and of greatest depth at its center and gradually diminishing in depth to its ends, where they join the outer surface of the water jacket. Centrally of these recesses and in communication therewith are formed upwardly extending recesses 9 whose upper walls are inclined upwardly as shown by dotted lines in cross section in Fig. 2. The bolts 11, which are preferably circular in cross section, have their lower ends upwardly bent and of a form and size to snugly fit within the recesses 9 when the parts are in finally assembled position. The shanks of the bolts 11 extend through holes in the cylinder head 5, and the extremities of the bolts project beyond the upper surface of the head and are threaded to receive the clamping nuts 12. The inner, upturned ends 13 of the bolts 11 present vertical faces slightly curved horizontally to agree with the curvature of the inner walls of recesses 7, said curves being generated from the axial center of the bolt.

To assemble the parts the shanks of the bolts 11 are passed upwardly through the bores in the cylinder head, and the bent ends 13 are inserted in the recesses 7 in a position substantially parallel with the face of the cylinder. The bolts are then turned, causing the ends 13 to enter the recesses 7 until said ends lie beneath the recesses 9. The bolts are then lifted, the nuts 12 applied to the threaded outer ends of the bolts and screwed up until the ends 13 are drawn snugly within the upper ends of recesses 9. The inclined upper faces of the ends 13 coöperate with the similarly inclined walls of the recesses 9 to draw, with a wedging action, the bolts tightly against the outer face of the cylinder. The cylinder and cylinder head are thus tightly clamped together, and the lower ends of the bolts are locked in clamping position by the engagement of their ends with the vertical recesses 9.

The construction above described provides a very efficient, simple, and easily manipulated clamping bolt for holding the cylinder and cylinder head in assembled relation, and which has the advantage over former constructions where the bolts pass through drilled holes in webs formed within the water jacket in that the holding means in the cylinder for the bolts does not materially obstruct the circulation of the cooling liquid. Another advantage following from the present construction is that the bolts are readily accessible, and if injured or broken may be replaced at very little cost and slight trouble.

Having thus described my invention, what I claim as new and desire to secure by Letters Patent of the United States is:—

1. A clamping device comprising a member having a recess therein with an inner wall which is curved in the arc of a circle, said recess gradually diminishing in depth outwardly to one end where it meets the surface of said member, a locking recess formed with an undercut upper wall and communicating with the curved recess, a second member, and a bolt passing through said second member and having an upwardly bent end to enter the locking recess and threaded at its other end to receive a nut, said bolt being in axial alinement with the center of curvature of the first-mentioned recess.

2. In a device of the class described, a cylinder provided with a spaced wall having therein a plurality of curved recesses and other recesses communicating therewith and arranged at an angle to the first-named recesses and provided with upwardly and inwardly inclined upper walls, a cylinder head on said cylinder provided with a plurality of perforations, bolts having their lower ends upturned and provided with upper inclined surfaces to fit the inclined walls of the second-named recesses and their outer extremities curved to fit the curvature of the first-named recesses, the shanks of said bolts being adapted to enter said perforations, and nuts threaded to the outer ends of said bolts and arranged to have bearing on the cylinder head to draw the bent ends of the bolts in said vertical recesses, whereby the cylinder and its head are firmly clamped together.

3. A clamping device comprising a member having an arc-shaped recess therein having its greatest depth at the center and gradually diminishing in depth to its ends, a locking recess communicating with the first recess and having an inclined upper wall, a second member adapted to be clamped to the first member and provided with a bore, and a bolt occupying said bore and having one end bent at an acute angle to enter the locking recess and its opposite end threaded to receive a nut, the bolt being adapted for movement first longitudinally to disengage its bent end from the locking recess and then axially to carry said end out of the arc-shaped recess in unclamping said members.

In testimony whereof I affix my signature in presence of two witnesses.

FRED K. SHAFFER.

Witnesses:
W. E. SCHOENBORN,
H. P. ROBERTS.

---

Copies of this patent may be obtained for five cents each, by addressing the "Commissioner of Patents, Washington, D. C."